Oct. 7, 1941.  F. L. MAIN  2,258,257

MASTER CYLINDER

Filed April 18, 1938  2 Sheets-Sheet 1

INVENTOR
FRANK L. MAIN
BY *Whittemore Hulbert & Belknap*
ATTORNEYS

INVENTOR
FRANK L. MAIN
ATTORNEYS

Patented Oct. 7, 1941

2,258,257

UNITED STATES PATENT OFFICE 2,258,257

MASTER CYLINDER

Frank L. Main, Birmingham, Mich., assignor to Kelsey-Hayes Wheel Company, Detroit, Mich., a corporation of Delaware Application April 18, 1938, Serial No. 202,787

7 Claims. (Cl. 60—54.6)

The invention relates to hydraulic brake apparatus and refers more particularly to master cylinders which develop braking fluid pressure for applying a brake.

The invention has for one of its objects to provide an improved construction of master cylinder which provides for the replenishment of the brake system including the wheel cylinders with the braking fluid and which also provides for the escape or air or other gas from the system. The invention has for other objects to so construct the master cylinder that the packing means for the piston does not at any time engage an abrading shoulder, such as formed by a port; to so construct the master cylinder that the means forming the communication between the reservoir and the cylinder is controlled by a valve separate from the piston; and to so construct the master cylinder that means common to both the piston and the valve is adapted to actuate both. The invention has for further objects to so construct the master cylinder that its parts may be readily formed and assembled; and to so construct the master cylinder that the fluctuation in the level of the braking liquid in the reservoir is greatly reduced and kept within small limits.

With these and other objects in view, the invention resides in the novel features of construction and combinations and arrangements of parts as more fully hereinafter set forth.

Figure 1:
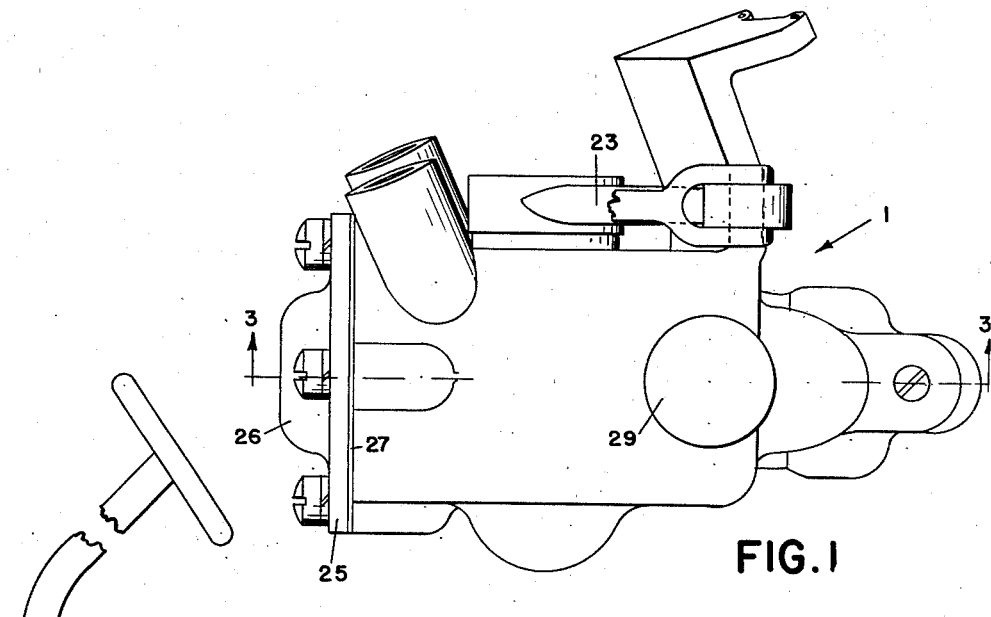
Figure 1 is a plan view of a master cylinder showing an embodiment of my invention.
Figure 3:
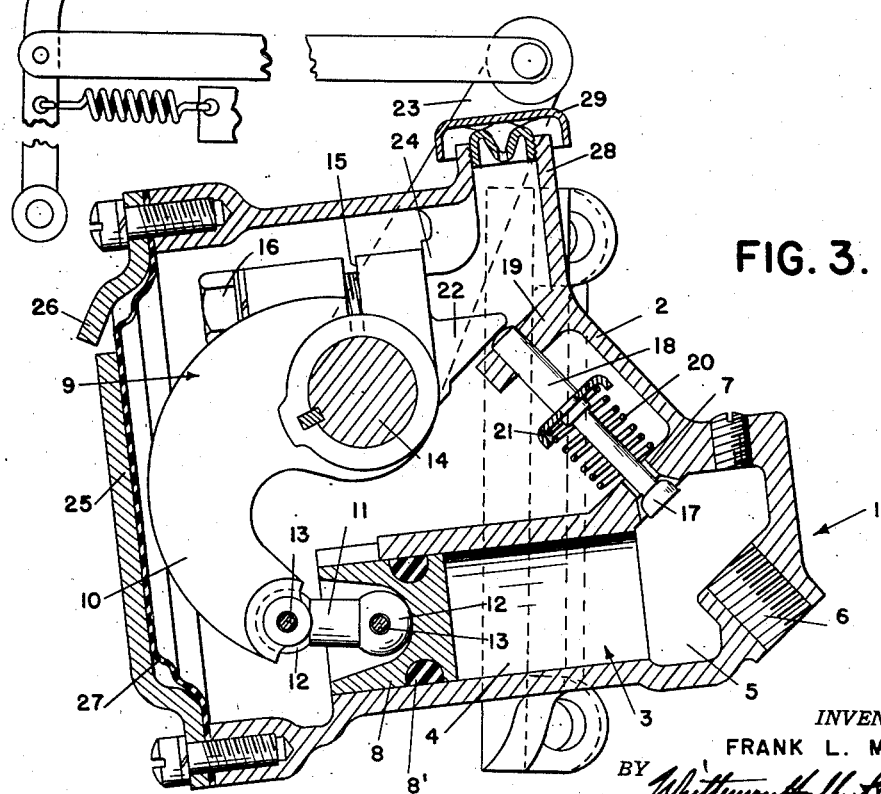
Figure 3 is a cross section on the line 3—3 of Figure 1.
Figure 2:
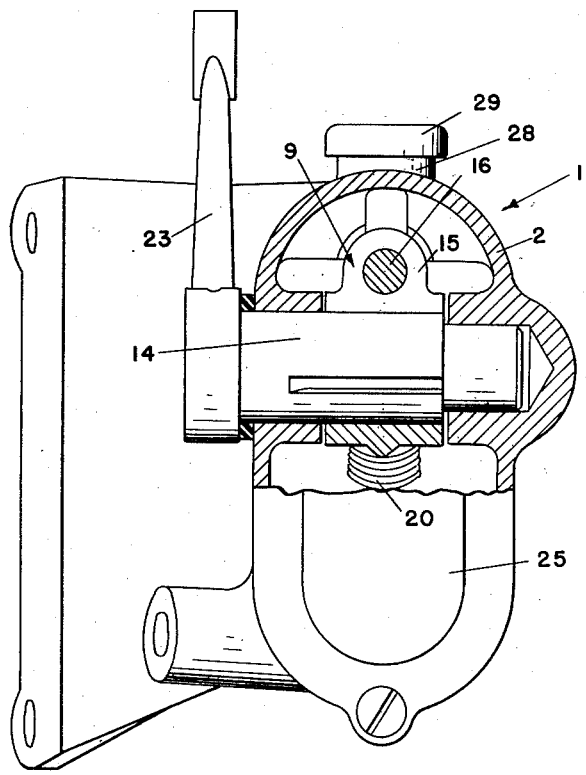
Figure 2 is an end elevation thereof, partly in section.

Referring to Figures 1, 2 and 3, 1 is the master cylinder which is adapted to develop braking fluid pressure in that portion of the brake system including the wheel cylinders to apply the brakes of a motor vehicle. The master cylinder comprises the reservoir having the hollow body 2 and also comprises the cylinder 3 formed within and at one side of the body. As shown in the present instance, the cylinder is formed at the bottom of the body. Both the body and the cylinder are preferably formed of a casting. The cylinder comprises the piston engaging portion 4 and the forward portion 5 located in advance of the piston engaging portion and extending to a height above the uppermost part of the piston engaging portion. The forward portion 5 is adapted to communicate with the tubing leading to the wheel cylinders through the port 6. The forward portion is also adapted to communicate with the reservoir through the port 7 in its upper wall.

8 is the piston reciprocable within the piston engaging portion 4 of the cylinder and provided with the annular packing member 8', which is preferably a rubber ring. The piston is adapted to be advanced and retracted by means of the bell crank 9 which is connected to the piston by the arm 10 and the connecting rod 11. The rear end of the cylinder opens into the reservoir and provides clearance for the arm. The connecting rod has the ball portions 12 at its opposite ends adapted to bear upon the piston and the arm. Suitable pins 13 connect the ball portions to the piston and arm, slight clearance being preferably provided for the pins in the ball portions to assure contact of the ball portions with the bearing faces of the piston and arm when the piston is being advanced. The bell crank is preferably keyed to the shaft 14 which extends transversely through the body 2 of the reservoir and is journaled in its side walls. The hub of the bell crank is preferably transversely split at 15 and the portions adjacent the split are threadedly engaged by the cap bolt 16.

17 is a valve for closing the port 7, this valve being movable into the forward portion 5 of the cylinder to open position. The valve has the stem 18 extending upwardly and at an angle within the reservoir and slidably engaging and guided by the wall or bracket 19 of the body 2. A suitable coil spring 20 between the wall of the forward portion of the cylinder and the C-washer or cap 21 secured upon the stem 18 serves to normally hold the valve 17 in closed position. To positively open the valve, I have provided the arm 22 upon the bell crank 9 and on the opposite side of the shaft 14 from the arm 10, this arm 22 being engageable with the upper end of the valve stem when the bell crank is in its normal position. The bell crank is adapted to be swung by means of the lever 23 secured upon an end of the shaft 14 at one side of the reservoir, the free end of this lever being connected by a link to the foot pedal of the motor vehicle and held in normal position by means of the usual coil spring which is connected to the foot pedal to hold it in normal position. To determine the normal position of the bell crank, I have provided the lug 24 upon the reservoir body and engageable with the hub of the bell crank above the arm 22.

25 is the metal cover for the body 2, this cover being secured to the body at the end thereof adjacent the bell crank arm 10. The cover is preferably provided with the struck-out portion 26 which is located in the upper portion of the cover and is inclined and overhangs the lower portion and provides an opening through which air may freely pass. Clamped between the cover and the adjacent end of the body of the reservoir is the flexible diaphragm 27 which is preferably formed of rubber and provides clearance for the bell crank arm 10 and at the same time seals the reservoir from air outside the same. The diaphragm has an inherent resiliency such that as the piston 8 is advanced the diaphragm moves inwardly to substantially compensate for the increased volume of the cylinder in communication with the reservoir to reduce the fluctuation in level of the braking liquid in the reservoir and maintain the level substantially constant to thereby prevent surging which tends to fill the fluid with small air bubbles. The reservoir body is also provided with the filler neck 28 having an open upper end through which the braking liquid may be poured. 29 is a cap threaded upon the filler neck and forming a breather to permit the passage of air, but to exclude dirt, water, etc.

It will be noted that the port 6 is in axial alignment with the port 7 and the bearing in the wall or bracket 19 for the valve stem 18 so that both the port 7 and the bearing and also the seat for the valve 17 may be readily formed. It will also be noted that by reason of the end cover for the reservoir, the cylinder 3 may be readily machined and the cooperating parts including the piston, the link, the bell crank, and the valve retracting spring, readily assembled and secured in place, the valve having been inserted through the port 6. Also the diaphragm and the cover may be readily secured in place.

The valve spring 20 is preferably calibrated so that a predetermined degree of vacuum in the forward portion 5 of the cylinder during the retractile movement of the piston will open the valve 17 thereby permitting braking liquid to enter the forward cylinder portion and be added to the braking system. Differently calibrated valve springs may be used to regulate the priming operation to suit the total leverage employed and also to compensate for brake drum expansion and brake shoe lining wear, so that adjustment of the brake shoes to secure a predetermined clearance between the brake drums and linings after considerable lining wear has occurred need not be urgent or critical. As a result, it will be seen that priming is not ordinarily a function of piston position, spring tension on the foot pedal, or friction in the mechanical connections, but is directly controlled by the strength of the valve spring.

In operation, as the foot pedal is depressed against the tension of the spring holding it in normal position it through the lever 23 and the shaft 14 will move the bell crank 9 angularly in a counterclockwise direction. During the first portion of this movement, the arm 22 of the bell crank moves away from the valve stem 18 and allows the valve 17 to close the port 7. At the same time, the bell crank arm 10 through the connecting rod advances the piston 8 and as this advancement continues, the braking liquid is forced outwardly through the port 6 and the tubing to the wheel cylinders to apply the brakes. When the foot pedal is released, the parts are returned to their normal positions, the bell crank through the connecting rod retracting the piston. With the valve spring 20 calibrated, the valve will open when a predetermined degree of vacuum occurs in the forward cylinder portion. Also, if the valve is not in open position, the bell crank will positively open the same during the final portion of the retractile movement of the piston. The valve, being open, provides for passage of the braking liquid into the cylinder 3 and also provides for escape of air or other gas from the cylinder 3, or that portion of the brake system beyond the cylinder. In this connection, it is important to note that the master cylinder 1 is mounted in a position inclined to the horizontal axis of the vehicle in such a manner that the axis of the cylinder 3 is correspondingly inclined upwardly from its rear end. As a result air or other gas will not be trapped in the piston engaging portion of the cylinder.

It will be noted that the port 7 is located beyond the limit of advance of the piston and its packing ring so that neither the piston nor the packing ring can engage the shoulder formed by the port and be abraded thereby. This is very important, especially with reference to the packing ring.

Figure 4:
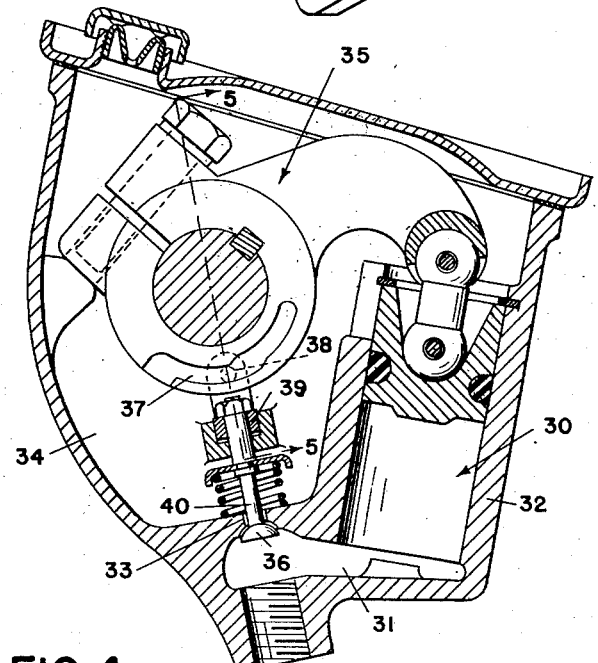
Figure 4 is a view similar to Figure 3 showing another embodiment of my invention.
Figure 5:
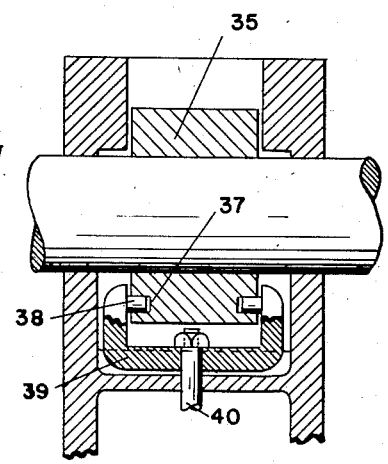
Figure 5 is a cross section on the line 5—5 of Figure 4.

In the modification illustrated in Figures 4 and 5, the construction of the master cylinder in general is the same as that of Figures 1, 2 and 3. However, the axis of the cylinder 30 is more nearly vertical than horizontal, but the portion 31 of the cylinder forward of the piston engaging portion 32 is adapted to communicate through the port 33 with the reservoir 34 at a zone elevated above the highest part of the lower end of the piston engaging portion. The construction of master cylinder also differs in that the bell crank 35 is adapted to positively open and close the valve 36, this being accomplished by providing the opposite ends of the hub of the bell crank with the cam grooves 37 which are engageable by the pins 38 secured to the yoke 39, which in turn is secured to the valve stem 40.

What I claim as my invention is:

1. A master cylinder, comprising a cylinder, a piston within said cylinder, a reservoir having a portion adapted to communicate with the forward end of said cylinder beyond the limit of advance of said piston, said portion extending to a height above the communication and said cylinder being inclined downwardly from said portion whereby braking liquid may flow under gravity from said reservoir into said cylinder and air may pass from said cylinder into said reservoir, a valve controlling the communication, and means operatively connected to said piston and valve to advance the piston and to open the valve upon return movement of the piston.

2. A master cylinder, comprising a cylinder, a piston within said cylinder, packing means between said cylinder and piston carried by the latter, a reservoir having a portion adapted to communicate with the forward end of said cylinder beyond the limit of advance of said packing means, said portion extending to a height above the communication and the cylinder being inclined downwardly from said portion whereby braking liquid may flow under gravity from said reservoir into said cylinder and air may pass from said cylinder into said reservoir, a valve controlling the communication, and means operatively connected to said piston and valve to advance the piston and open the valve upon return movement of the piston.

3. A master cylinder, comprising a cylinder having a piston engaging portion inclined upwardly toward its forward end and a chamber axially beyond said piston engaging portion, said chamber having a port in its upper side and an outlet in its lower side in alignment with said port, a reservoir extending above said chamber adapted to communicate therewith through said port whereby braking liquid may flow by gravity from said reservoir into said chamber and air may pass from said inclined cylinder into said chamber and through said port into said reservoir, said reservoir having a flange extending inwardly from its forward wall and having an opening therein in axial alignment with said port and said outlet, a valve for controlling said port having a head extending into said chamber and a stem extending through said port into said reservoir, the upper end of said stem passing through the opening in said flange and extending a predetermined distance above said flange, a spring for normally holding said valve in closed position, a piston reciprocable in said piston engaging portion of the cylinder, and a bell crank having one arm operatively connected to said piston to advance the latter, and another arm engageable with the upper end of said valve stem for opening said valve.

4. A master cylinder, comprising a cylinder having a piston engaging portion inclined upwardly toward its forward end and a chamber axially beyond said piston engaging portion, said chamber having a port in its upper side and an outlet in its lower side axially beyond said port, said port and said outlet having a common axis inclined upwardly and rearwardly, a reservoir extending above said chamber adapted to communicate therewith through said port whereby braking liquid may flow by gravity from said reservoir into said chamber and air may pass from said inclined cylinder into said chamber and through said port into said reservoir, said reservoir having a flange extending inwardly from its forward wall and having an opening therein in axial alignment with said port and said outlet, a valve for controlling said port having a head extending into said chamber and a stem extending through said port into said reservoir, the upper end of said stem passing through the opening in said flange and extending a predetermined distance above said flange, a spring for normally holding said valve in closed position, a piston reciprocable in said piston engaging portion of the cylinder, a shaft extending transversely through said reservoir above said cylinder, a bell crank mounted upon said shaft and having one arm operatively connected to said piston and another arm engageable with the upper end of said valve stem, said bell crank upon rotation in one direction advancing said piston and upon rotation in the other direction opening said valve against the action of said spring, and a stop upon said reservoir engageable with a portion of said bell crank for limiting the movement of said valve by said bell crank.

5. A master cylinder, comprising a cylinder, a piston within said cylinder, a reservoir communicating with the rearward side of the cylinder and having its rearward side open, a cover for the rearward side of the reservoir, said cover having an opening therein, and a diaphragm within said reservoir adjacent the inner surface of said cover for reducing the fluctuation in level of the braking fluid in said reservoir during the reciprocation of said piston.

6. A master cylinder, comprising a cylinder having a piston engaging portion inclined upwardly toward its forward end and having a chamber axially beyond the piston engaging portion, said chamber having a port in its upper side and having an outlet opening in its lower side opposite said port, a reservoir extending above said chamber adapted to communicate therewith through said port whereby braking fluid may flow by gravity from said reservoir into said chamber and air may pass from said inclined cylinder into said chamber and through said port into the reservoir, a valve controlling said port, a piston reciprocable in the piston engaging portion of the cylinder, and means for actuating said valve in timed relation to the movement of the piston.

7. A master cylinder, comprising a cylinder inclined upwardly toward its forward end, a piston within said cylinder, said cylinder having a chamber positioned axially beyond the limit of advance of said piston and having an outlet opening in the lower side of the chamber, a reservoir extending above said chamber adapted to communicate therewith through a port in the upper side of the chamber whereby braking liquid may flow by gravity from the reservoir into the chamber and air may pass from the inclined cylinder into the chamber and through said port into the reservoir, a valve for controlling the port having a head extending into the chamber and having a stem extending through the port into the reservoir, and a member within the reservoir movable in one direction to advance the piston and in the opposite direction to open said valve.

FRANK L. MAIN.